Figure 1:
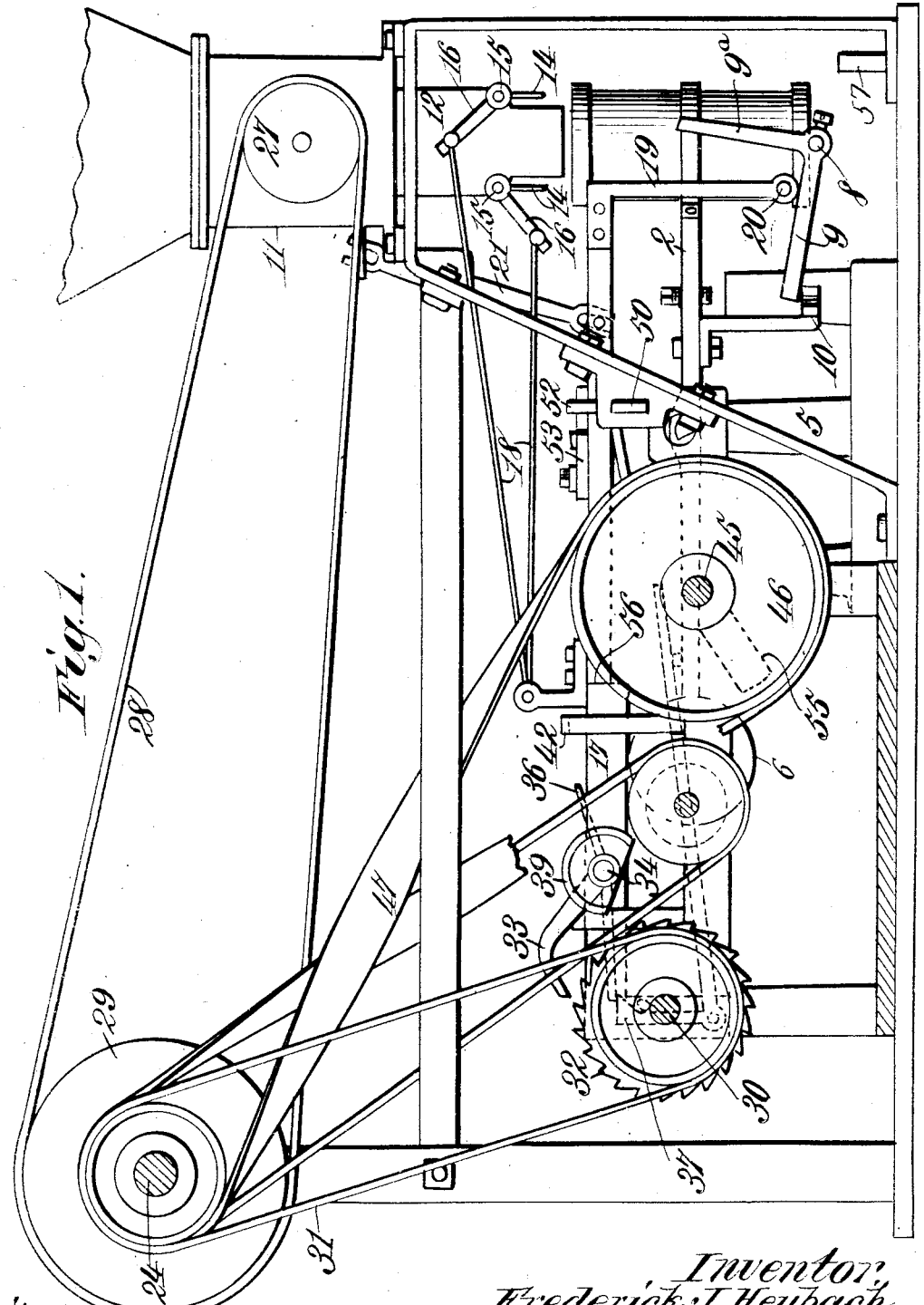

No. 791,342. PATENTED MAY 30, 1905.
F. J. HEYBACH.
WEIGHING APPARATUS.
APPLICATION FILED FEB. 3, 1905.

4 SHEETS—SHEET 1.

Witnesses,
Robert Everett,
James L. Norris, Jr.

Inventor,
Frederick J. Heybach,
By James L. Norris.
Atty.

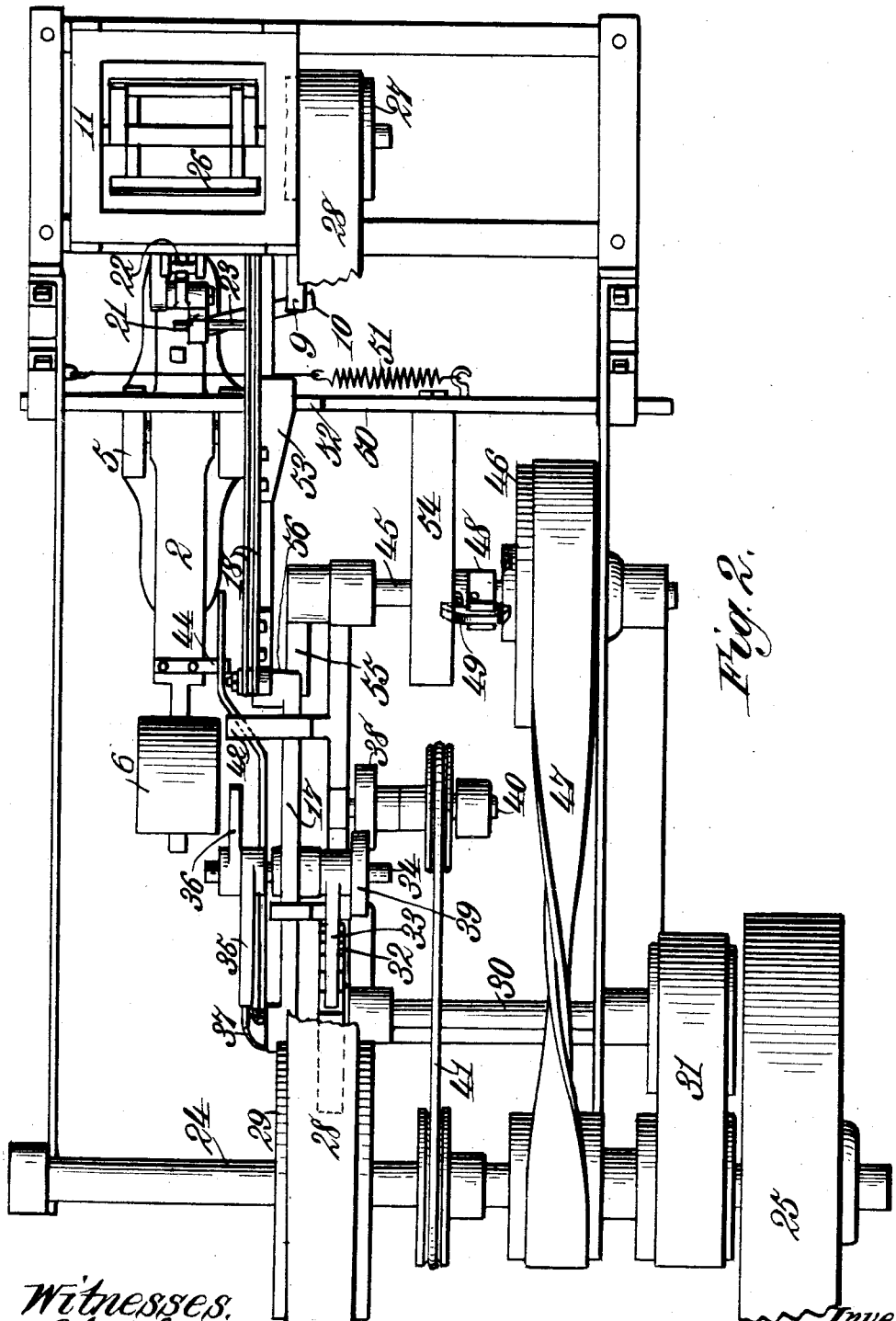

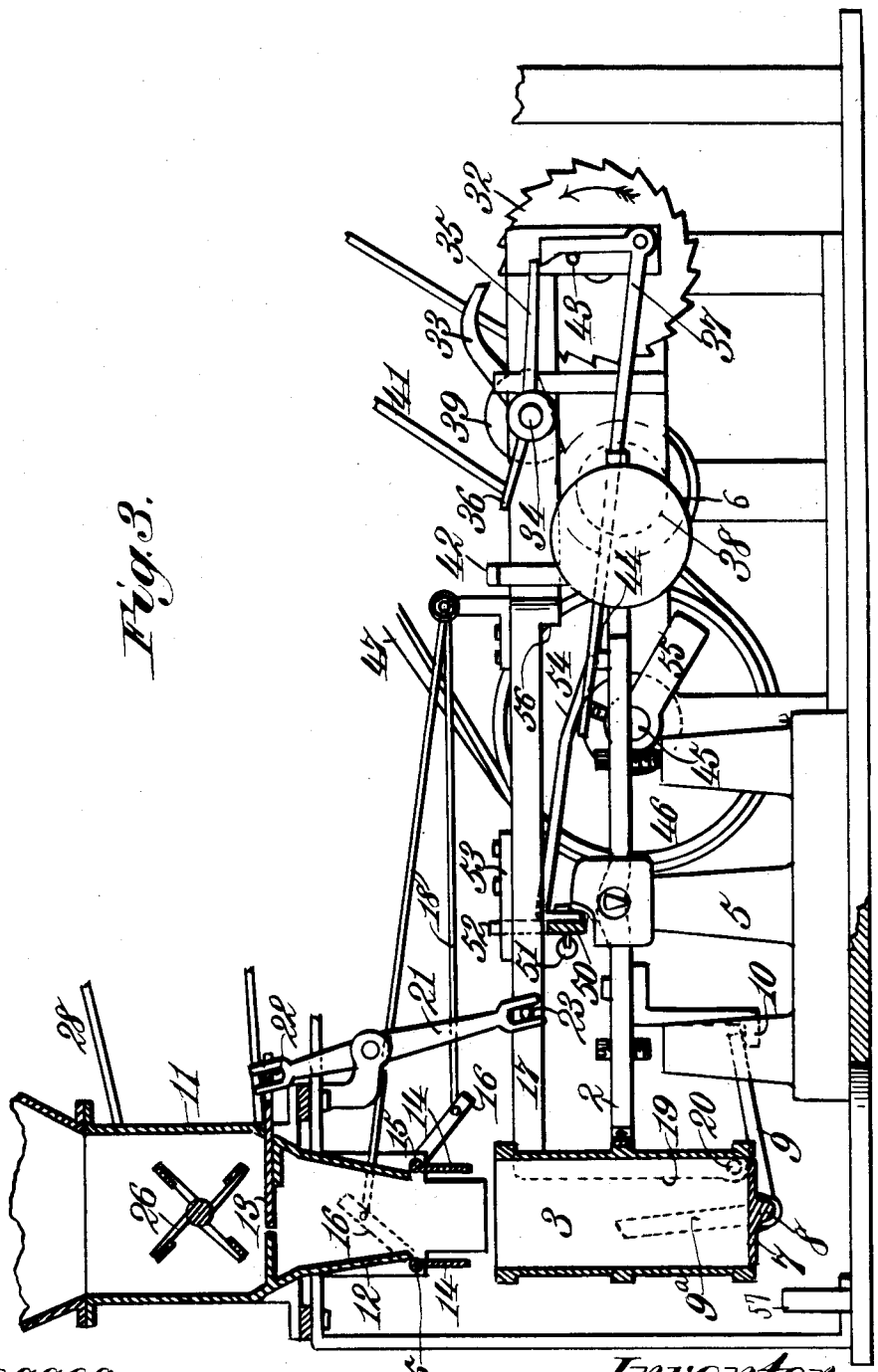

No. 791,342. PATENTED MAY 30, 1905.
F. J. HEYBACH.
WEIGHING APPARATUS.
APPLICATION FILED FEB. 3, 1905.
4 SHEETS—SHEET 4.
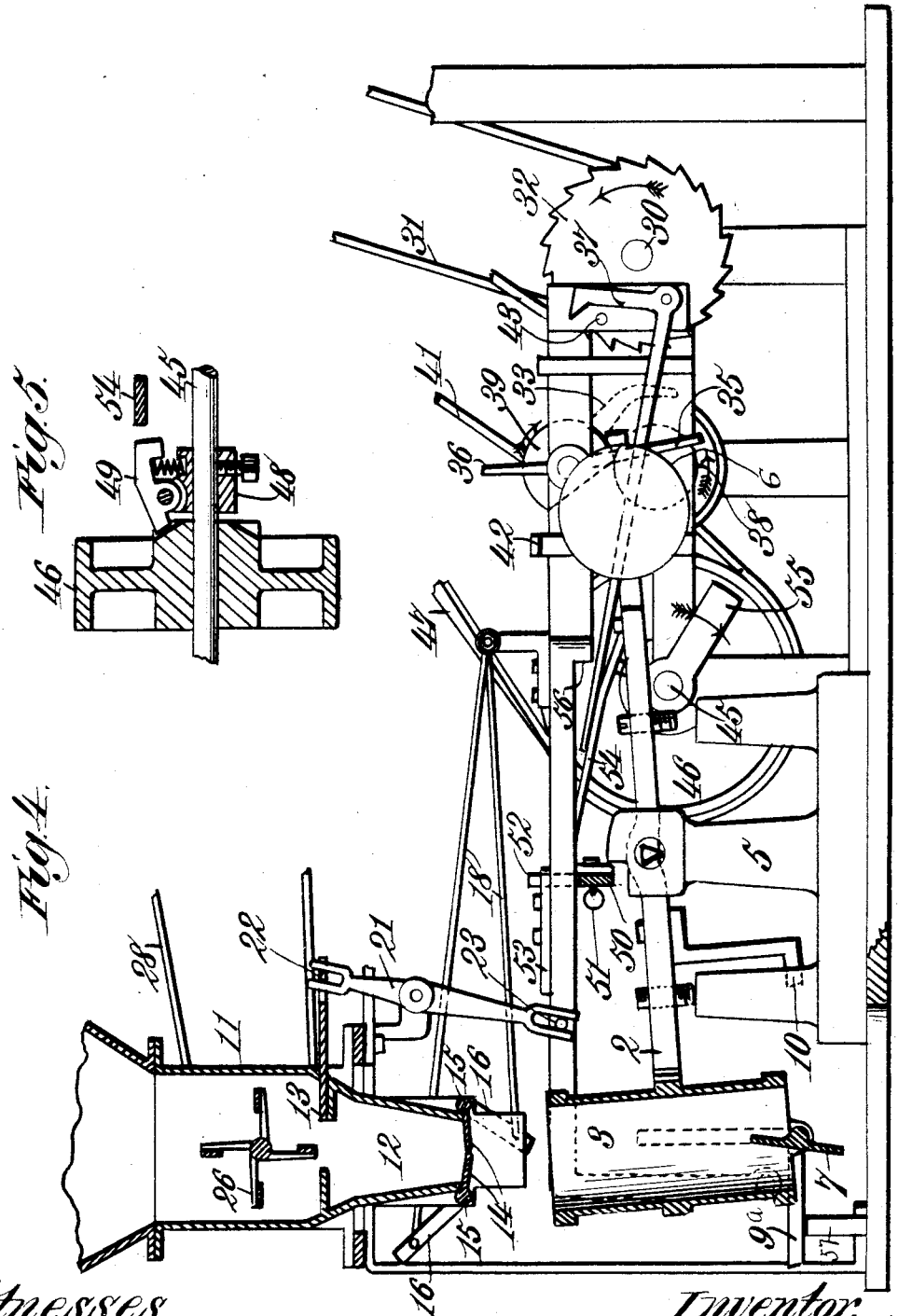
Witnesses.
Robert Ewett,
James L. Norris Jr.
Inventor.
Frederick J. Heybach,
By James L. Norris
Atty.

No. 791,342.

Patented May 30, 1905.

UNITED STATES PATENT OFFICE.

FREDRICK J. HEYBACH, OF SAVANNAH, GEORGIA, ASSIGNOR OF ONE-HALF TO MOREHOUSE MANUFACTURING COMPANY, OF SAVANNAH, GEORGIA, A CORPORATION OF GEORGIA.

WEIGHING APPARATUS.

SPECIFICATION forming part of Letters Patent No. 791,342, dated May 30, 1905.

Application filed February 3, 1905. Serial No. 244,034.

*To all whom it may concern:*

Be it known that I, FREDRICK J. HEYBACH, a citizen of the United States, residing at Savannah, in the county of Chatham and State of Georgia, have invented new and useful Improvements in Weighing Apparatus, of which the following is a specification.

This invention relates to weighing apparatus, the object of the invention being to provide a simple apparatus of this character for weighing and delivering automatically and with accuracy and rapidity predetermined charges of material, which latter may be of any suitable kind.

The apparatus is of that type known as "positively-actuated," it involving power-controlled mechanism of such nature as to insure the several operations that take place in weighing and delivering loads of material in correct sequence.

In the drawings accompanying and forming a part of this specification I represent an organization of parts involving my invention, which I will fully set forth in the following description; but I do not limit myself to the disclosure thus made, for certain variations may be made within the scope of my claims succeeding said description.

In said drawings, Figure 1 is a side elevation of a weighing apparatus involving my invention and showing the parts in their normal positions. Fig. 2 is a top plan view of said apparatus. Fig. 3 is a side elevation of the same, partly in section, the view being opposite from that side appearing in Fig. 1 and also, like the latter, representing the parts in their normal positions. Fig. 4 is a similar view showing the positions assumed by the parts during the discharge of a load. Fig. 5 is a sectional detail of a clutch, a coöperating pulley, and supporting-shaft therefor.

Like characters refer to like parts throughout the different views.

The apparatus, as previously indicated, may be employed for weighing and delivering any substance which can be weighed mechanically. In the adaptation of the apparatus illustrated in the drawings it is especially arranged for weighing materials that will not flow freely, so that in conjunction with the supply device I employ a force-feed or agitating mechanism, all as will hereinafter appear.

The weighing apparatus involves weighing mechanism, which of course may be of any suitable character. The weighing mechanism illustrated comprises a scale-beam 2 and a bucket 3. The beam is fulcrumed between its ends in the customary way upon a pillar or post constituting a part of the framework of the machine, (denoted in a general way by 5.) The framework, as will be evident, may be of any desirable character. The beam, as is usual, involves a poising branch or arm and a counterpoising branch, the bucket or equivalent load-carrier being directly supported by the poising branch or arm of said beam, while the counterpoising branch or arm thereof is provided with a counterbalance 6, adapted to balance the bucket, its appurtenances, and the load in said bucket.

The load-discharge-controlling means involves a closer or discharge-valve, as 7, which is represented as being of disk form for the reason that the bucket is cylindrical in shape. The said closer or valve 7 when shut fits within the bottom of the bucket and is provided with diametrically opposite journals 8, supported for rocking motion by the bucket. I do not in the organization illustrated provide for the latching of the closer or discharge-controlling valve 7 in its shut position, but rely on weighted or equivalent means, as will hereinafter appear, to secure this result, for the machine illustrated is particularly adapted for weighing small charges, such as bodies of baking-powder that are to be delivered to cans after having been weighed. Fixedly carried by one of the laterally-extending journals 8 of the closer are weighted arms (designated by 9 and 9$^a$, respectively) and one of them longer than the other, said longer arm 9 being adapted to rest, when the closer is shut, upon a lateral projection 10 on the poising side of the beam 2, during which period the short arm 9$^a$ is disposed approximately upright and at about a right angle to the companion and long arm. The means for effecting the initial opening movement of the closer is located between these two arms, as will hereinafter appear. At this point, however, I deem it necessary to state that upon the completion of a load the shorter arm 9ª will be forcibly operated and swung over with the companion arm. After they have been forcibly moved a certain distance they will automatically or by their weight move beyond such point in order to swing the closer wide open or to a substantially vertical position, so that the contents of the bucket can pass therefrom to be disposed of as may be desired. At the proper point the long arm 9 will be forcibly operated to reverse the operation just set forth and bring about the shutting of the closer, the closer when shut occupying, as will be understood, a horizontal position, during which time the long arm rests upon the projection 10 of the beam.

The supply device for furnishing the material to the load-carrier of the weighing mechanism may be of any desirable character. It is represented as consisting of a hopper 11 and a tubular spout 12, depending from the hopper. In like manner the means for controlling the supply of material to the bucket may be of any suitable character. It is shown as consisting of an upper valve 13 of the sliding type and two lower valves 14 of swinging form. The lower valves when shut fit edge to edge, their rear edges being united with rock-shafts, each designated by 15 and supported by the spout 12. When the two valves 14 are open, they occupy a substantially vertical position. Each rock-shaft rigidly carries outside the spout 12 a crank-arm 16, to which means are connected for opening and closing said valves 14. The upper valve controls the outlet of the hopper 11. The action of the valves is as follows: When the two lower valves are closed, the bucket at this time being either loaded or discharging a load, the upper valve will be wide open, so as to permit the passage into the space between the said upper and lower valves of a body of material in quantity sufficient to make up nearly a complete load. When the said lower valves are opened, this mass of material is discharged into the bucket, and simultaneously with the opening of the said two valves 14, which might be considered as main valves, the upper or auxiliary valve is moved until it is nearly closed, or a distance sufficient to permit the passage from the hopper through the spout into the bucket and on the load in the bucket of a reduced or attenuated stream of material sufficient to make up the load partially delivered thereinto on the opening of said lower valves. When the load is discharged, the lower valves are simultaneously closed to arrest the further supply of material to the bucket, and at the same time the upper or auxiliary valve is opened wide in order to permit the supply into the tubular spout 12 of a mass of material almost sufficient to make up the predetermined load. The mechanism illustrated for securing the action of the valves in the order indicated will be hereinafter more particularly described.

Suitably guided upon the framework of the machine is an endwise-reciprocatory power-actuated member, (denoted in a general way by 17.) The different parts whereby the several valves hereinafter described are operated receive their motion from this member 17. Jointed to said member are what might be considered the inner ends of two rods, as 18, the opposite ends of said rods being connected with the crank-arms 16. At the extreme forward end of the said member is a pendent arm 19, having a lateral projection 20 disposed between the arms 9 and 9ª. When the said member 17 is advanced, as hereinbefore described, the two rods 18 will be given an advancing endwise movement to simultaneously close the two valves 14, while the projection 20 will strike the short arm 9ª to kick the closer 7 open or impart an initial opening motion to the closer in the manner hereinbefore described. The parts will be so proportioned that the two valves 14 will be fully closed before the closer 7 is open. On the return motion of said member 17 the projection 20, movable therewith, will strike the long arm 9 and cause the shutting of the closer, following which the two valves 14 will be opened wide by the rods 18 as they are retracted by and with the member 17 as the same moves backward. The reciprocatory motion of said member 17 is secured by power-operated mechanism, as will hereinafter appear, rendered primarily effective by means under the control of the weighing mechanism.

Fulcrumed between its ends upon the framing of the machine is a lever 21, terminating in forks, between the branches of the upper one of which a pin, as 22, upon the shank of the sliding valve 13 is adapted to fit, while a pin 23 on the member 17 is adapted to fit between the branches of the lower bifurcation. When, therefore, the member 17 is advanced as hereinbefore described, the lever 21 will be rocked, as previously indicated, in order to open the valve 13 wide, the valves 14, as will be understood, being simultaneously closed. On the return motion of the member 17, during which the valves 14 are opened, the lever will be oppositely moved to secure the movement of the valve 13 to its drip position, or a position partially closing the outlet of the hopper 11.

Supported upon the upper side of the framework is the main shaft 24 of the apparatus, which may be driven in any desirable way—for example, by means of a pulley or band-wheel, as 25, on one end thereof. In the hopper is represented as mounted an agitator, as 26, the shaft of which is supported by the opposite side walls of said hopper and carries a pulley, as 27, connected by a belt, as 28, with a pulley, as 29, on the main shaft 24, which main shaft is continuously operated, or, in other words, is driven as long as the apparatus is in action. It therefore follows that the agitator is continuously operated. I do not deem a specific description of the agitator or force-feed device 26 necessary, for the same may be of any desirable character.

Located below the main shaft is a second shaft 30, the two being operatively connected by a belt-transmitting means, (denoted in a general way by 31.) It therefore follows that the shaft 30 is continuously operative. Rigidly fastened to said shaft 30 in any desirable way is a ratchet-wheel 32, coöperative with a pawl 33, rigidly fastened to a rock-shaft 34, supported by the endwise-reciprocatory member 17. The pawl-shaft 34 carries oppositely-disposed arms 35 and 36, the arm 35 being somewhat longer than the arm 36 and its free end normally resting upon the short and vertically-disposed arm of an angular latch 37, pivoted near its angle upon a downward extension at what might be considered the rear end of the member 17. The latch 37 is automatically operative, the long arm thereof having a sufficient weight to cause the short arm to assume an upright position where it can engage under the coöperating arm 35 on the pawl-shaft 34, which, as will be understood, is the normal relation. The pawl is automatically operative and normally its point is situated substantially vertically over the axis of the coöperating ratchet-wheel, but is held out of contact with the teeth thereof by the latch. When the latch is tripped, (and this result, as will hereinafter appear, is accomplished by the weighing mechanism,) the pawl can automatically or by its weight, together with that of the arm 35, drop against the rotating ratchet-wheel in order to cause an endwise movement of the pawl and an advancing stroke of the member 17. As the ratchet-wheel rotates it carries the pawl downward therewith to a point where the pawl will pass out of engagement with the ratchet-wheel. At this point, however, the advancing stroke of the member 17 will have been completed, during which advancing stroke the operations as hereinbefore described are brought about. After the pawl is moved out of engagement with the ratchet-wheel it is necessary to return it to its original position, and this result can be accomplished by a friction-wheel, as 38, coöperative with the mutilated friction-wheel 39 on the pawl-shaft. The friction-wheel 38 is rigid upon a shaft, as 40, supported by the framing of the machine and connected by belt-gearing (denoted in a general way by 41) with the main shaft 24. It will therefore be understood that the shaft 40 is continuously operative. When, consequently, the latch is tripped in the manner hereinbefore described, the pawl, as stated, will fall against the coöperating ratchet-wheel and will be advanced and simultaneously turned thereby. When the endwise movement of the pawl is completed, the point thereof will pass free of the teeth of the ratchet-wheel, so that the pawl can drop well away from the ratchet-wheel, during which motion the periphery of the mutilated friction-wheel 39 is carried against the periphery of the rotative friction-wheel 38. The instant that the two wheels come in contact the mutilated wheel will be rotated until the mutilated portion thereof comes opposite the periphery of the coöperating friction-wheel, the pawl during such motion being swung around to its original position. It will be understood that when the member 17 is in its retracted position the mutilated friction-wheel 39 is not directly over the coöperating friction-wheel 37, but is only brought to such relation when the member 17 is given its endwise advancing motion. When the pawl reaches its original position on the member 17, the latter at this time being advanced, the short arm 36 will strike against the overhanging head or effective portion of the stop 42, fixed to the base of the framework of the machine, simultaneously with the striking of the long arm 35 against the vertical arm of the latch 37, so that there will be no possibility of the accidental tripping of such latch due to shock, the latter, as will be evident, being received by the head of the stop 42. It might be stated at this time that the short arm of the latch is held against a suitable stop, as 43, on the inner pendent portion of the member 17 by the weight of the long arm thereof, said short arm at this time being under the arm 35 when the pawl 33 is in its original position.

Upon the counterpoising side of the beam 2 is shown a trip device, as 44, for the latch 37. This trip device is illustrated as a lateral projection and is adapted when the load is completed in the load-carrier or bucket 3 to trip the latch 37 and release the pawl 33, so that the latter can drop against the ratchet-wheel 32 in the manner hereinbefore indicated to effect the advancing motion of the member 17. As said member advances the several valves hereinbefore described are operated.

I will now set forth the mechanism for securing the return motion of the member 17, during which the valve or closer 7 is shut while the valves 14 are opened wide, the valve 13 during the backward motion of the member 17 being moved to its partially-closed position, all as hereinbefore fully set forth.

A shaft is shown at 45 and as carrying a driven member, as 46, which may be a pulley connected by belting (denoted in a general way by 47) with the main shaft 24. The pulley 46, like certain other parts hereinbefore described, is continuously operative. It runs loose, however, on its shaft, but is intermittently coupled or clutched thereto. For this purpose I show a clutch (designated in a general way by 48) fastened to the shaft 45 and including in its make-up a spring-actuated finger, as 49. I do not deem it necessary to set forth in detail the structure of the clutch, as it forms no part of the present invention.

Extending transversely of the machine is a slide 50, constituting a clutch-controller, to which and the framework of the machine are connected the terminals of a coiled pull-spring 51. From the upper side of the slide 50 rises a projection 52, coöperative with a cam 53, having a beveled face and rigid on the member 17. The projection 52 will be held normally solidly against the cam by the spring 51. The slide 50 has a lateral arm 54, which normally bears upon the tail of the spring-finger 49 to hold the opposite end of the finger out of a notch in the hub of the continuously-rotative pulley 46. When, however, the member 17 is advanced, as hereinbefore described, the cam 53 will move therewith and will release the slide 50, so that the spring 51 can pull the slide in such a direction as to move the arm 54 from off the tail of the finger 51. When the finger is freed by the arm, the spring of the finger will at once shoot the operative portion thereof into one of the notches in the hub of the pulley, thereby coupling the pulley to the shaft 45 to rotate the latter. The release of the clutch-controlling slide 50 occurs during the advancing movement of the member 17. Upon the shaft 45 is an actuator 55, represented as an arm extending at right angles therefrom and, when the shaft is at rest, horizontally and below a shoulder 56 on the member 17 between the ends of the latter. When the shaft 45 has made about three-fourths of a rotation, the upper end of the actuator 55 will strike the shoulder 56, the member 17 at this time being in its advanced position, and as the shaft continues to rotate the actuator will by thrusting against the shoulder impart a return movement to the member 17, and after said member 17 has reached its original position the actuator will ride off the shoulder and will continue to move until it reaches its primary position, where it is arrested, as will now appear. As the member 17 is retracted the cam 53 will of course move therewith, and its face will ride against the projection 52 of the slide 50, thereby to positively retract the latter and also to carry the arm 54 to its original position. When the clutch device 48 has made one full turn, the tail of the finger 49 will ride against the under side of the arm 54, then in its original position, in order to withdraw the working end of the finger from out of one of the notches in the hub of the pulley 46 to unclutch the latter from its shaft, the actuator or arm 55 at this time being in its original position.

Briefly set forth, the operation of the invention is as follows: When the apparatus is at rest, the bucket 3 will be empty and up, while the closer or discharge-controlling valve 7 will be shut. The valves 14 will be wide open and the valve 13 will be partially closed. It will be assumed that the hopper 11 contains no material. With the parts in this relation the main shaft 24 of the apparatus will be put in motion, after which the latch 37 will be tripped, so as to, in the manner hereinbefore described, cause the forward motion of the member 17. Immediately following the tripping of the latch, material will be delivered to the hopper. As the member 17 moves forward, the valves 14 will be simultaneously closed, while the valve 13 will be opened wide. During the forward motion of said member the closer 7 will be open; but as there is no material in the bucket no evil will result. When the valve 13 is wide open and the valves 14 are closed, material can flow from the hopper 11 into the spout 12, the material that accumulates in the spout and is supported upon the two valves 14 serving to make up practically the load. On the backward motion of the member 17 the closer 7 is shut, as hereinbefore described, and immediately following this the valves 14 are opened wide and the valve 13 closed to the so-called "drip" position. As the valves 14 open, the mass of material supported upon them passes into the bucket to nearly make up the load therein, the load being completed by the small stream that passes the valve 13 from the hopper 11. When the material enters the bucket, the latter descends, the counterpoising side of the beam ascending, so that when the load is fully completed the trip device 44 will strike the latch 37 and trip it in order to cause, in the manner hereinbefore described, the automatic action of the member 17. Originally, as will be understood, the apparatus is put in motion by hand; but after this, as will be evident, the action of the apparatus is wholly automatic. As the member 17 advances the closer 7 is opened, as hereinbefore described, and is closed upon the return motion of said member 17. The timing of the parts is such that the member 17 is maintained in its advanced position a sufficient length of time to assure the complete emptying of the bucket. To dislodge every particle of material from the closer 7 when the same is opened, the short arm 9ª is adapted to strike against a suitable abutment, as 57, on the framework of the machine, so that the closer will be jarred sufficiently to dislodge all matter thereon.

Having thus described my invention, what I claim is—

1. In a weighing apparatus, the combination of weighing mechanism involving a load-receiver, a reciprocatory member, a power-operated ratchet-wheel, a pawl on the reciprocatory member, means for normally holding the pawl out of engagement with the ratchet-wheel, and mechanism coöperative with the weighing mechanism for permitting the pawl to engage the ratchet-wheel to impart an advancing movement to said reciprocatory member, and the latter, when advanced, serving to effect the discharge of a load from the load-receiver.

2. In a weighing apparatus, the combination of weighing mechanism involving a load-receiver, a movably-mounted member, a power-driven ratchet-wheel, a pawl on the movably-mounted member, means for normally holding the pawl out of engagement with the ratchet-wheel, mechanism controlled by the weighing mechanism for permitting the pawl to engage the ratchet-wheel, the latter during such engagement serving to operate the movably-mounted member in a direction to effect the discharge of the load-receiver, and means independent of the ratchet for returning the pawl to its original position.

3. In a weighing apparatus, the combination of weighing mechanism involving a load-receiver, a movably-mounted member, a power-driven ratchet-wheel, a pawl on the movably-mounted member, means for normally holding the pawl out of engagement with the ratchet-wheel, mechanism controlled by the weighing mechanism for permitting the pawl to engage the ratchet-wheel, the latter during such engagement serving to operate the movably-mounted member in a direction to effect the discharge of the load-receiver, means independent of the ratchet for returning the pawl to its original position, and gearing involving a continuously-operative driving member and a driven member, the latter being carried by the movable member, and the gear members, when in operative relation, serving to coact to return the pawl to its original position.

4. In a weighing apparatus, the combination of weighing mechanism involving a load-receiver, a movably-mounted member, a ratchet-wheel, a pawl on the movably-mounted member, means for normally holding the pawl out of engagement with the ratchet-wheel, mechanism controlled by the weighing mechanism for permitting the pawl to engage the ratchet-wheel, the latter, on such engagement, serving to actuate the movably-mounted member in a direction to cause the discharge of the load-receiver, gearing for returning the pawl to its original position and involving a continuously-operative member and a second member carried upon the movably-mounted member, one of the gear members being mutilated.

5. In a weighing apparatus, the combination of weighing mechanism involving a load-receiver, a movably-mounted member, a power-driven ratchet-wheel, a pawl on the movably-mounted member, a latch on the movably-mounted member, for normally holding the pawl out of engagement with the ratchet-wheel, and means coöperative with the weighing mechanism for operating the latch to release the pawl to permit the latter to engage the ratchet-wheel, the latter on such engagement serving to operate the movably-mounted member in a direction to effect the discharge of the load from the load-receiver.

6. In a weighing apparatus, the combination of weighing mechanism involving a load-receiver and a scale-beam, a reciprocatory member, a power-operated ratchet-wheel, a pawl upon the reciprocatory member, an automatic latch on the reciprocatory member for normally holding the pawl out of engagement with the ratchet-wheel, and a trip device on the scale-beam, for engaging the latch, to release the pawl to permit the pawl to engage the ratchet-wheel, the latter, on such engagement, serving to impart a movement to the reciprocatory member in a direction to cause the discharge of the load from the load-receiver.

7. In a weighing apparatus, the combination of weighing mechanism involving a load-receiver, a reciprocatory member, a power-operated ratchet-wheel, a pawl on the reciprocatory member, means for normally holding the pawl out of engagement with the ratchet-wheel, mechanism operative with the weighing mechanism for causing the pawl to engage the ratchet-wheel, the latter, on such engagement, serving to impart an advancing movement to the said reciprocatory member in a direction to cause the discharge of the load from the load-receiver, and means independent of the ratchet-wheel for imparting a return motion to said reciprocatory member.

8. In a weighing apparatus, the combination of weighing mechanism involving a load-receiver, a reciprocatory member, a power-operated ratchet-wheel, a pawl on the reciprocatory member, means for normally holding the pawl out of engagement with the ratchet-wheel, mechanism operative with the weighing mechanism for permitting the pawl to engage the ratchet-wheel, the latter, on such engagement, serving to impart an advancing movement to the said reciprocatory member in a direction to cause the discharge of the load from the load-receiver, means independent of the ratchet-wheel for returning the pawl to its original position, and means for imparting a return motion to said reciprocatory member.

9. In a weighing apparatus, the combination of weighing mechanism including a load-receiver, a reciprocatory member, intermittently-operative power-controlled means, controlled by the weighing mechanism, for imparting an advancing motion to said reciprocatory member to cause it to effect the discharge of the load from the load-receiver, and mechanism for imparting a return motion to said reciprocatory member.

10. In a weighing apparatus, the combination of weighing mechanism involving a load-receiver, a movably-mounted member, power-controlled means, operative with the weighing mechanism, for imparting an advancing motion to the said movably-mounted member to cause it to effect the discharge of the load from the load-receiver, and power-controlled means arranged to be set in action by the said movably-mounted member, for imparting a return motion to the latter.

11. In a weighing apparatus, the combination of weighing mechanism involving a load-receiver, a movably-mounted member, power-operated means controlled by the weighing mechanism for imparting an advancing movement to the movably-mounted member in a direction to cause the discharge of a load from the load-receiver, and mechanism for imparting a return movement to the movably-mounted member, involving a clutch, and a clutch-controller, adapted to be released to permit the action of the clutch on the advancing motion of the movably-mounted member.

12. In a weighing apparatus, the combination of weighing mechanism involving a load-receiver, a movably-mounted member, power-operated means controlled by the movably-mounted member in a direction to cause it to effect the discharge of a load from the load-receiver, a shaft provided with a clutch and a driver, the shaft having an actuator to impart a return motion to the movably-mounted member, a clutch-controller to normally hold the clutch in an inoperative position, and means, coöperative with the movably-mounted member, for holding the clutch-controller normally in its effective position and to permit the movement of the clutch-controller in a direction to permit the operation of the clutch on the advancing motion of said movably-mounted member.

13. In a weighing apparatus, the combination of weighing mechanism, involving a load-receiver, a reciprocatory member, power-controlled means governed by the weighing mechanism, for imparting an advancing motion to said movably-mounted member in a direction to cause it to discharge the load from the load-receiver, mechanism involving a shaft provided with an actuator for the movably-mounted member, a clutch, and a driving member for returning the movably-mounted member to its original position, a spring-controlled clutch-controller, means upon the movably-mounted member for holding the clutch-controller normally in its retracted or effective position and serving, on the advancing motion of the movably-mounted member to permit the operation of the clutch-controller by its spring.

14. In a weighing apparatus, the combination of weighing mechanism involving a load-receiver, means for supplying material to the load-receiver, including a hopper having a depending spout, valve mechanism controlling the discharge of material from the hopper into the spout, valve mechanism for controlling the discharge of material from the spout, and mechanism, coöperative with the weighing mechanism, for closing the second valve mechanism and for simultaneously opening the first valve mechanism and for concurrently effecting the discharge of the load-receiver.

15. In a weighing apparatus, the combination of weighing mechanism involving a load-receiver, means for supplying material to the load-receiver, involving a hopper having a depending spout, valve mechanism for controlling the discharge of material from the hopper to the spout, valve mechanism for controlling the discharge of material from the spout to the load-receiver, a movably-mounted member, power-operated means controlled by the weighing mechanism for effecting an advancing movement to the movably-mounted member, and mechanism, adapted, on said advancing movement, to close the second valve mechanism to open the first valve mechanism and concurrently to effect the discharge of the load-receiver.

16. In a weighing apparatus, the combination of weighing mechanism involving a load-receiver, a reciprocatory member, a power-operated ratchet-wheel, a pawl on the reciprocatory member, an automatic latch pivotally supported upon the said reciprocatory member for normally holding the pawl out of engagement with the ratchet-wheel, mechanism, operative with the weighing mechanism, for tripping the latch to permit the pawl to engage the ratchet-wheel, the latter, on such engagement, serving to impart an advancing motion to said reciprocatory member, means, inoperative when the reciprocatory member is in its retracted position, but operative when the same is advanced for returning the pawl to its original position, and means, independent of the ratchet-wheel, for returning said reciprocatory member to its original position.

17. In a weighing apparatus, the combination of weighing mechanism, having a bucket provided with a closer, weighted arms angularly disposed to each other, and a reciprocatory power-operated member arranged to be set in action by the weighing mechanism, having means to alternately engage said arms to open and shut the closer.

18. In a weighing apparatus, the combination of weighing mechanism including a bucket and a scale-beam supporting the same, a closer for the bucket, arms angularly disposed to each other and connected with the closer, a reciprocatory member, mechanism, controlled by the weighing mechanism, for operating said reciprocatory member, the latter, on one motion, serving to operate one arm to open the closer, and on the other motion, to operate the other arm to shut the closer, and means supported by the scale-beam and against which one of the arms is adapted to rest when the closer is shut.

19. In a weighing apparatus, the combination of weighing mechanism involving a load-receiver, a reciprocatory member, a power-operated ratchet-wheel, a pawl on the reciprocatory member, a latch carried by said reciprocatory member for normally holding the pawl out of engagement with the ratchet-wheel, mechanism coöperative with the weighing mechanism for tripping the latch to permit the pawl to engage the ratchet-wheel, the latter, on said engagement, serving to impart an advancing movement to the reciprocatory member, means independent of the ratchet-wheel for returning the pawl to its original position, where it can be held by said latch, and means, separate from the latch, for receiving the jar thereof when it reaches its original position.

In testimony whereof I have hereunto set my hand in presence of two subscribing witnesses.

FREDRICK J. HEYBACH.

Witnesses:
HEATH SUTHERLAND,
GEO. W. REA.